(12) United States Patent
Taibi et al.

(10) Patent No.: US 11,729,422 B2
(45) Date of Patent: Aug. 15, 2023

(54) ENCODER AND METHOD FOR ENCODING A TILE-BASED IMMERSIVE VIDEO

(71) Applicant: INTERDIGITAL CE PATENT HOLDINGS, Paris (FR)

(72) Inventors: Charline Taibi, Cesson-Sevigne (FR); Frederique Humbert, Rennes (FR); Remi Houdaille, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 31 days.

(21) Appl. No.: 17/058,881

(22) PCT Filed: May 24, 2019

(86) PCT No.: PCT/EP2019/063429
§ 371 (c)(1),
(2) Date: Nov. 25, 2020

(87) PCT Pub. No.: WO2019/228916
PCT Pub. Date: Dec. 5, 2019

(65) Prior Publication Data
US 2021/0203987 A1    Jul. 1, 2021

(30) Foreign Application Priority Data
May 31, 2018  (EP) ..................... 18305674

(51) Int. Cl.
*H04N 19/597* (2014.01)
*H04N 19/109* (2014.01)
*H04N 19/174* (2014.01)
*H04N 21/81* (2011.01)
(Continued)

(52) U.S. Cl.
CPC ......... *H04N 19/597* (2014.11); *H04N 19/109* (2014.11); *H04N 19/174* (2014.11);
(Continued)

(58) Field of Classification Search
CPC .. H04N 19/597; H04N 19/109; H04N 19/174; H04N 21/43072; H04N 21/816;
(Continued)

(56) References Cited

U.S. PATENT DOCUMENTS 9,788,077 B1    10/2017  Shen et al.
10,397,618 B2    8/2019  Ugur et al.
(Continued)

FOREIGN PATENT DOCUMENTS

WO    2009117434 A1    9/2009

OTHER PUBLICATIONS

Karczewicz et al., "The SP- and SI-Frames Design for H.264/AVC," IEEE Transactions on Circuits and Systems for Video Technology, vol. 13, No. 7, pp. 637-644 (Jul. 2003).
(Continued)

*Primary Examiner* — Richard T Torrente
(74) *Attorney, Agent, or Firm* — Volpe Koenig (57) ABSTRACT

During a streaming session of tile based immersive video, upon request to switch from at a current tile segment associated with a current tile to a new tile segment associated with a new tile at a reference time, an encoder (300) is providing to generate one or more complementary frames of the new tile segment allowing a decoding, by a requesting player, of the new tile segment from the reference time.

12 Claims, 8 Drawing Sheets

(51) Int. Cl.
*H04N 21/845* (2011.01)
*H04N 21/43* (2011.01)

(52) U.S. Cl.
CPC ..... *H04N 21/43072* (2020.08); *H04N 21/816* (2013.01); *H04N 21/8455* (2013.01); *H04N 21/8456* (2013.01)

(58) Field of Classification Search
CPC .......... H04N 21/8455; H04N 21/8456; H04N 21/6373; H04N 21/21805; H04N 19/164; H04N 21/23439; H04N 21/26258
See application file for complete search history.

(56) References Cited

U.S. PATENT DOCUMENTS

| | | |
|---|---|---|
| 2013/0089142 A1 | 4/2013 | Begen et al. |
| 2017/0111670 A1 | 4/2017 | Ducloux et al. |
| 2017/0163994 A1 | 6/2017 | Sanchez de la Fuente et al. |
| 2018/0103199 A1* | 4/2018 | Hendry ............ H04N 21/21805 |
| 2019/0286318 A1* | 9/2019 | Lee ..................... H04N 5/45 |
| 2019/0362151 A1* | 11/2019 | Stokking ................ G06V 20/20 |
| 2020/0053253 A1* | 2/2020 | Kavallierou ....... H04N 21/4622 |
| 2020/0204841 A1* | 6/2020 | Van Brandenburg ........................ H04N 21/85406 |

OTHER PUBLICATIONS

Podborski, "Virtual Reality And Dash," International Broadcasting Conference (Sep. 2017).

\* cited by examiner

ENCODER AND METHOD FOR ENCODING A TILE-BASED IMMERSIVE VIDEO

This application is the U.S. National Stage, under 35 U.S.C. § 371, of International Application No. PCT/EP2019/063429 filed May 24, 2019, which claims the benefit of European Application No. 18305674.6 filed May 31, 2018, the contents of which are incorporated herein by reference.

TECHNICAL FIELD

The present disclosure relates generally to the streaming of immersive videos (such as spherical videos, so called Virtual Reality (VR) 360° videos, or panoramic videos) to an end device through a delivery network.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spherical videos offer an immersive experience wherein a user can look around using a VR head-mounted display (HMD) or can navigate freely within a scene on a flat display by controlling the viewport with a controlling apparatus (such as a mouse or a remote control).

Such a freedom in spatial navigation requires that the whole 360° scene is delivered to a player (embedded within the HMD or TV set) configured to extract the video portion to be visualized depending on the position of the observer's aiming point within the scene. In such a situation, a high throughput is necessary to deliver the video.

Therefore, one main issue relies on the efficient transmission of spherical videos over bandwidth constrained network with an acceptable quality of immersive experience (i.e. avoiding freeze screen, blockiness, black screen, etc.). Currently, for delivering a spherical video service in streaming, a compromise is being sought between immersive experience, resolution of video and available throughput of the content delivery network.

The majority of known solutions streaming spherical videos provides the full 360° scene to the end device, but only less than 10% of the whole scene is presented to the user. Since delivery networks have limited throughput, the video resolution is decreased to meet bandwidth constraints.

Other known solutions mitigate the degradation of the video quality by reducing the resolution of the portion of the 360° scene arranged outside of the current viewport of the end device. Nevertheless, when the viewport of the end device is moved upon user's action to a lower resolution area, the displayed video suffers from a sudden degradation.

Besides, when the targeted usage requires that the displayed video is always at the best quality, it prevents from using solutions based on a transitional degradation of resolution when the user's aiming point is varying. Consequently, the delivered video must cover a part of the scene large enough to allow the user to pan without risking a disastrous black area display due to a lack of video data. This part of the scene can for instance include the area which is currently viewed (i.e. the viewport or aiming point) and the surrounding region to prevent quality degradation when the user moves its viewport. This can be achieved by spatially tiling the scene of the immersive video with a set of tiles and temporally dividing the immersive video into a plurality of video segments defined by a plurality of tile segments, a tile covering a portion of a scene of the immersive video and a tile segment being associated with a tile of the set of tiles. One or more relevant tile segments of the immersive video (corresponding to tile(s) comprising the viewport and its surrounding) are delivered to a player.

In particular, while the user navigates within the scene, new tile(s) (and corresponding tile segment(s)) can be needed to display the viewport. Nevertheless, when the available scene can be changed only with a periodicity of the segment duration, switching tile(s) can only occur at given instants (e.g. the beginning of a segment).

The present disclosure has been devised with the foregoing in mind.

SUMMARY

According to one or more embodiments, there is provided an encoder configured for encoding an immersive video spatially tiled with a set of tiles and temporally divided into a plurality of video segments defined by a plurality of tile segments, a tile covering a portion of a scene of the immersive video and a tile segment being associated with a tile of the set of tiles, said encoder comprising at least one processor configured for:
  receiving a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment,
  obtaining at least one complementary frame allowing a decoding, by a requesting player, of the new tile segment from the reference time.

According to one or more embodiments, there is provided a method for encoding, at an encoder, an immersive video spatially tiled with a set of tiles and temporally divided into a plurality of video segments defined by a plurality of tile segments, a tile covering a portion of a scene of the immersive video and a tile segment being associated with a tile of the set of tiles, said method comprising:
  receiving a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment,
  obtaining at least one complementary frame allowing a decoding, by a requesting player, of the new tile segment from the reference time.

According to one or more embodiments, there is provided a player configured for receiving an immersive video spatially tiled with a set of tiles and temporally divided into a plurality of video segments defined by a plurality of tile segments, a tile covering a portion of a scene of the immersive video and a tile segment being associated with a tile of the set of tiles,
said player comprising at least one processor configured for:
  sending a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment, receiving at least one complementary frame allowing a decoding of the new tile segment from the reference time.

According to one or more embodiments, there is provided a method for receiving, at a player, an immersive video spatially tiled with a set of tiles and temporally divided into a plurality of video segments defined by a plurality of tile segments, a tile covering a portion of a scene of the immersive video and a tile segment being associated with a tile of the set of tiles, said method comprising:

sending a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment, receiving at least one complementary frame allowing a decoding of the new tile segment from the reference time.

According to one or more embodiments, there is provided a computer program product at least one of downloadable from a communication network and recorded on a non-transitory computer readable medium readable by at least one of computer and executable by a processor, comprising program code instructions for implementing a method for encoding, at an encoder, an immersive video spatially tiled with a set of tiles and temporally divided into a plurality of video segments defined by a plurality of tile segments, a tile covering a portion of a scene of the immersive video and a tile segment being associated with a tile of the set of tiles, said method comprising:

receiving a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment, obtaining at least one complementary frame allowing a decoding, by a requesting player, of the new tile segment from the reference time.

According to one or more embodiments, there is provided a non-transitory program storage device, readable by a computer, tangibly embodying a program of instructions executable by the computer to perform a method for encoding, at an encoder, an immersive video spatially tiled with a set of tiles and temporally divided into a plurality of video segments defined by a plurality of tile segments, a tile covering a portion of a scene of the immersive video and a tile segment being associated with a tile of the set of tiles, said method comprising:

receiving a request to switch from at least one current tile segment associated with current tile to at least one new tile segment associated with a new tile corresponding to a same temporal interval of the immersive video as the current tile segment, the request comprising a reference time to implement tile switching from the current tile segment to the new tile segment, obtaining at least one complementary frame allowing a decoding, by a requesting player, of the new tile segment from the reference time.

According to one or more embodiments, there is provided a bitstream comprising at least one complementary frame obtained according to the method for encoding as described above.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned methods.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

Embodiments are depicted with regard to a streaming environment to deliver an immersive or large-field of view video (e.g. a spherical video, a panoramic video, etc.) to a client terminal through a delivery network.

Figure 1:
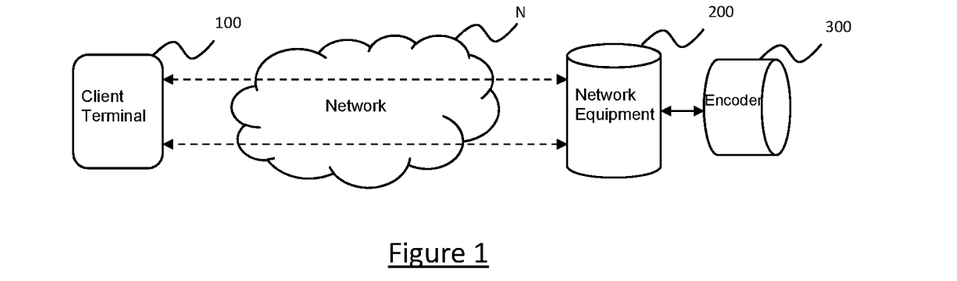
FIG. 1 is a schematic diagram of an exemplary Client-Server architecture wherein some embodiments might be implemented.

As shown in the exemplary embodiment of FIG. 1, a Client-Server network architecture, supported by a network N (e.g. the Internet, a home network, an enterprise network), comprises one or several client terminals 100 (only one client terminal is represented) and one or more network equipment 200 (only one is represented in FIG. 1), such as content servers (e.g. implementing the HTTP protocol to deliver data), and an encoder apparatus 300 providing encoded immersive (or large field of view) videos to content servers 200.

The client terminal 100 may wish to request a tile-based immersive video stored on the content server 200 during a streaming session (e.g. an adaptive streaming session).

The server 200 is configured to stream segments of the tile-based immersive video to the client terminal 100, upon client's request, using a streaming protocol. In the following, as an illustrative but non-limitative example, adaptive streaming (such as the HTTP adaptive streaming protocol, so called HAS, like MPEG-DASH or HTTP Live Streaming (HLS)) is considered to deliver the immersive video to the client terminal 100 from the server 200. Obviously, different type of streaming protocol can be implemented to support a streaming session of a tile-based immersive video.

Figure 2:
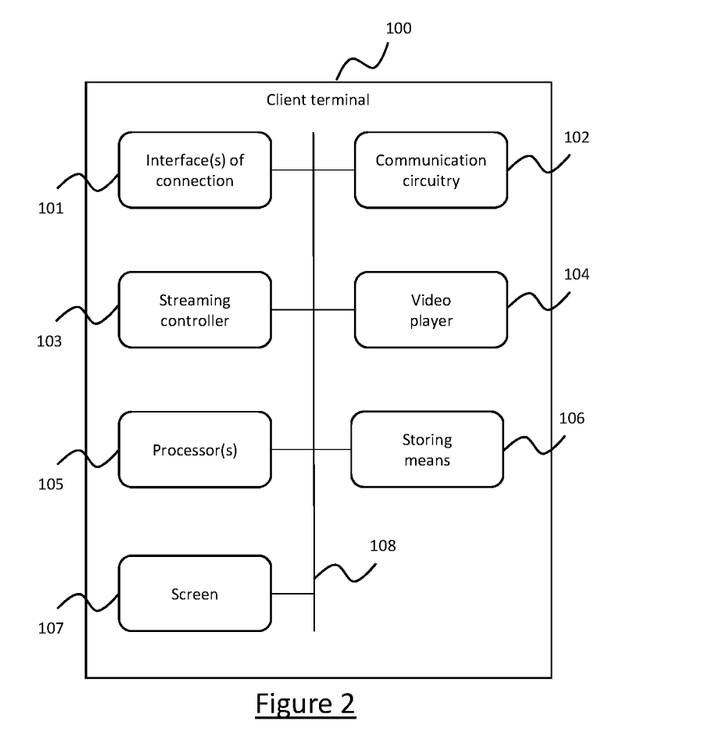
FIG. 2 is a schematic block diagram of an exemplary client terminal in accordance with an embodiment.

As shown in the example of FIG. 2, the client terminal 100 can comprise at least:
- interface(s) of connection 101 (wired and/or wireless, as for example Wi-Fi, Ethernet, etc.) to the network N or additional network (not shown in FIG. 1);
- a communication circuitry 102 containing the protocol stacks to communicate with the server 200. In particular, the communication module 102 comprises the TCP/IP stack well known in the art. Of course, it could be any other type of network and/or communicating means enabling the client terminal 100 to communicate with the server 200;
- a streaming controller 103 which receives the immersive video from the server 200 (and especially the corresponding segments);

a video player 104 adapted to decode and render the encoded immersive video;

one or more processor(s) 105 for executing the applications and programs stored in a non-volatile memory of the client terminal 100;

storing means 106, such as a volatile memory, for instance for buffering the segments received from the server 200 before their transmission to the video player 104;

an internal bus 107 to connect the various modules and all means well known to the skilled in the art for performing the generic client terminal functionalities.

As an example, the client terminal 100 is a portable media device, a mobile phone, a tablet or a laptop, a head mounted device, a TV set, a set-top box or the like. Naturally, the client terminal 100 might not comprise a complete video player, but only some sub-elements such as the ones for demultiplexing and decoding the media content and might rely upon an external means to display the decoded content to the end user.

Figure 3:
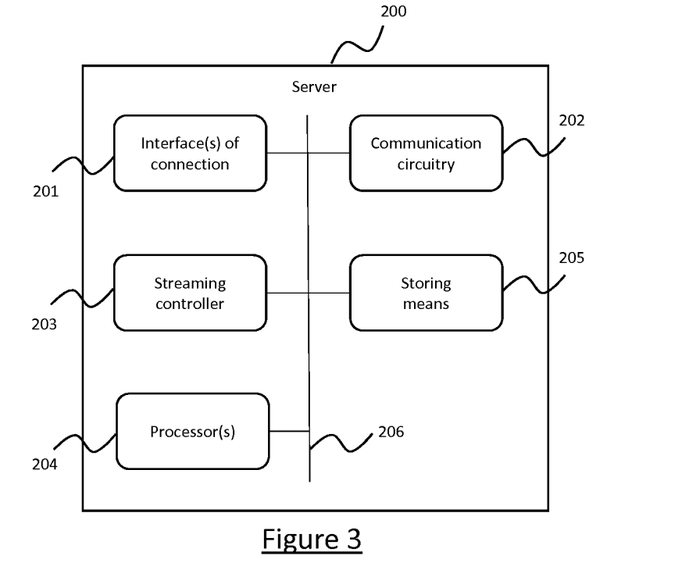
FIG. 3 is a schematic block diagram of an exemplary content server in accordance with an embodiment.

As shown in the embodiment of FIG. 3, the server 200 can comprise at least:

interface(s) of connection 201 (wired and/or wireless) to the network N or additional network (not shown in FIG. 1);

a communication circuitry 202 to deliver data to one or several requesting client terminals 100. In particular, the communication circuitry 202 can comprise the TCP/IP stack well known in the art. Of course, it could be any other type of network and/or communicating means enabling the server 200 to communicate with a client terminal 100;

a streaming controller 203 configured to deliver the tile-based immersive video to one or several client terminals 100;

one or more processor(s) 204 for executing the applications and programs stored in a non-volatile memory of the server 200;

storing means 205;

an internal bus 206 to connect the various modules and all means well known to the skilled in the art for performing the generic server functionalities.

Figure 4:
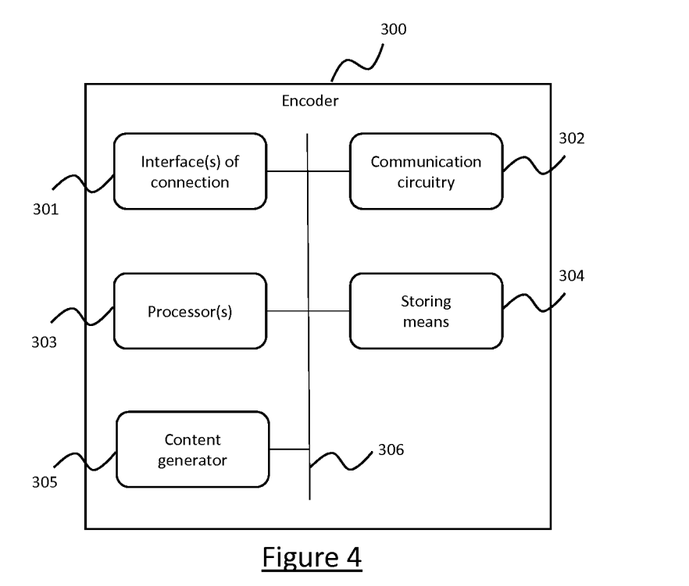
FIG. 4 is a schematic block diagram of an exemplary encoder in accordance with an embodiment.

As shown in the embodiment of FIG. 4, the encoder 300 can comprise at least:

interface(s) of connection 301 (wired and/or wireless) to the content server 200;

a communication circuitry 302 to deliver encoded data to one or several content servers 200. In particular, the communication circuitry 312 can comprise the TCP/IP stack well known in the art. Of course, it could be any other type of network and/or communicating means enabling the encoder 300 to communicate with server 200;

one or more processor(s) 303 for executing the applications and programs stored in a non-volatile memory of the encoder 300;

storing means 304;

a content generator 305 configured to generate and format the immersive video content. When encoded, the immersive video content stored in the storing means 304 can be forwarded to the content server 200;

an internal bus 306 to connect the various modules and all means well known to the skilled in the art for performing the generic functionalities of the encoder.

In a variant or complement, the encoder 300 may be embedded within the server 200 to form a single device.

Figure 5:
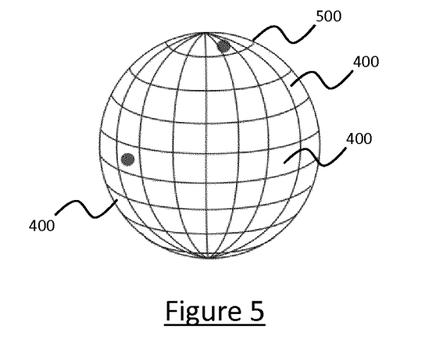
FIG. 5 depicts an exemplary tiling of a scene of a spherical video in accordance with an embodiment.

According to an exemplary embodiment shown in the FIG. 5, in a tile-based video service, the immersive video can be spatially sliced into a set of tiles 400 at the server/encoder side. The set of tiles covers the whole scene 500 of the immersive video (a sphere in the example of FIG. 5).

Figure 6:
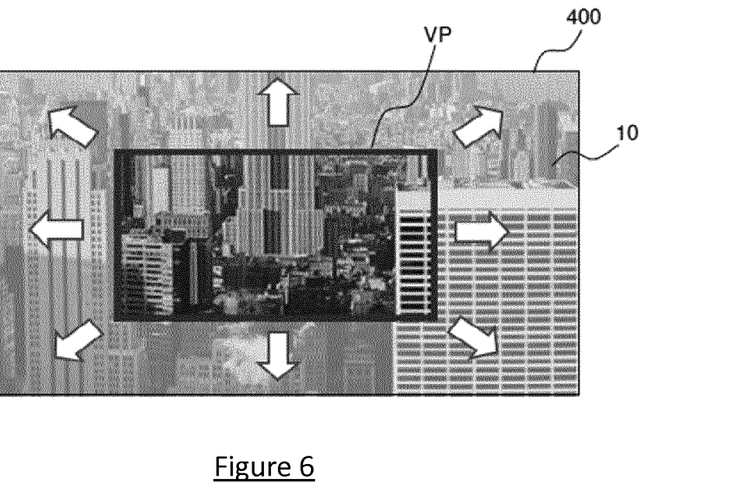
FIG. 6 shows an exemplary tile comprising a viewport according to an embodiment.
Figure 7:
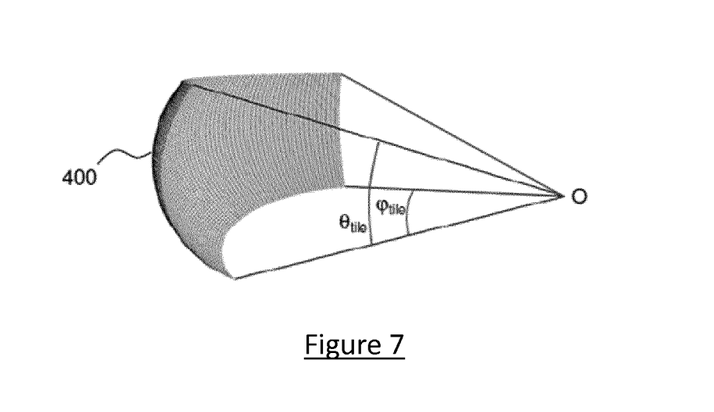
FIG. 7 shows an exemplary tile of the set of tiles covering the spherical video of FIG. 5, in accordance with an embodiment.

As shown in FIGS. 6 and 7, the size of the tiles 400 can be defined large enough to allow a variation of the focusing point without being forced to obtain and decode instantaneously another tile. In particular, in the following, it is assumed that one tile delivered to the terminal 100 can cover at least the part of scene 500 to be displayed through the viewport VP associated with the client terminal 100 requesting the immersive video. Naturally, in a variant or complement, when tiles are smaller than the viewport VP, several tiles might be needed to obtain the part of the scene displayed through the viewport VP.

While not necessary, it is further assumed that an overlap exists between consecutive tiles 400 of the set of tiles. In addition, while a tile of rectangular shape has been illustrated in FIG. 6, the present arrangements can naturally be applied to any other type of tile shape.

Figure 8:
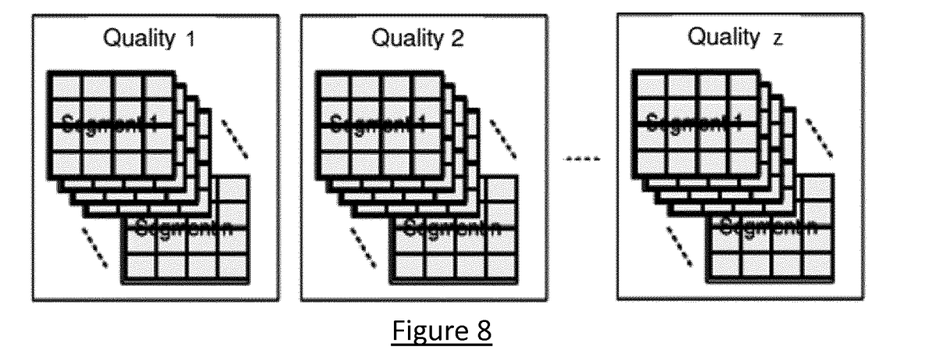
FIG. 8 schematically depicts a set of video segments and tile segments for different available representations of a tile-based immersive video formatted for adaptive streaming, in accordance with an embodiment.

In the example of adaptive streaming, the tile-based immersive video is temporally divided into a plurality of video segments of equal duration, each video segment being available at different video qualities or bit rates (also called representations) at the server 200, as shown in FIG. 8. While it may be different, it is assumed hereinafter that all the video segments of the immersive video are of equal duration.

In FIG. 8, for all the available video qualities (Quality 1, Quality 2, . . . , Quality z), each video segment 1 to n of the immersive video is spatially split in tiles 400 (each tile covering a portion of the immersive scene as illustrated in FIG. 5) according to the same tile arrangement. Each video segment is then defined by a set of tile segments of the same duration to cover the whole spherical scene (each tile segment being available at said different video qualities). Every tile segment—comprising a plurality of coded video frames—is of equivalent duration.

While a user navigates within the scene, new tile(s) (and corresponding tile segment(s)) can be needed to display the viewport. In normal operation mode, switching tile(s) occurs at defined switching time (e.g. called SAP or Stream Access Point according to the MPEG-DASH standard).

In an embodiment, to reduce latency, the duration of a tile segment can be chosen short (e.g. 0.5 second) and a tile segment $St_i$ (corresponding to a time $t_i$ of the immersive video) can comprise one Group Of Pictures (GOP) for reducing the number of I frames (Intra frames). For decoding of a segment $S_{ti}$, at least its first frame I is needed. Encoding schemes usually comprise bi-predictive frames (so called B frames which are Bi-directionally predicted frames, coded based on both previous and future coded frames) inserted between one-predictive frames (so called P-frames which are Predictively coded frames, coded based on previously coded frame).

Figure 10:
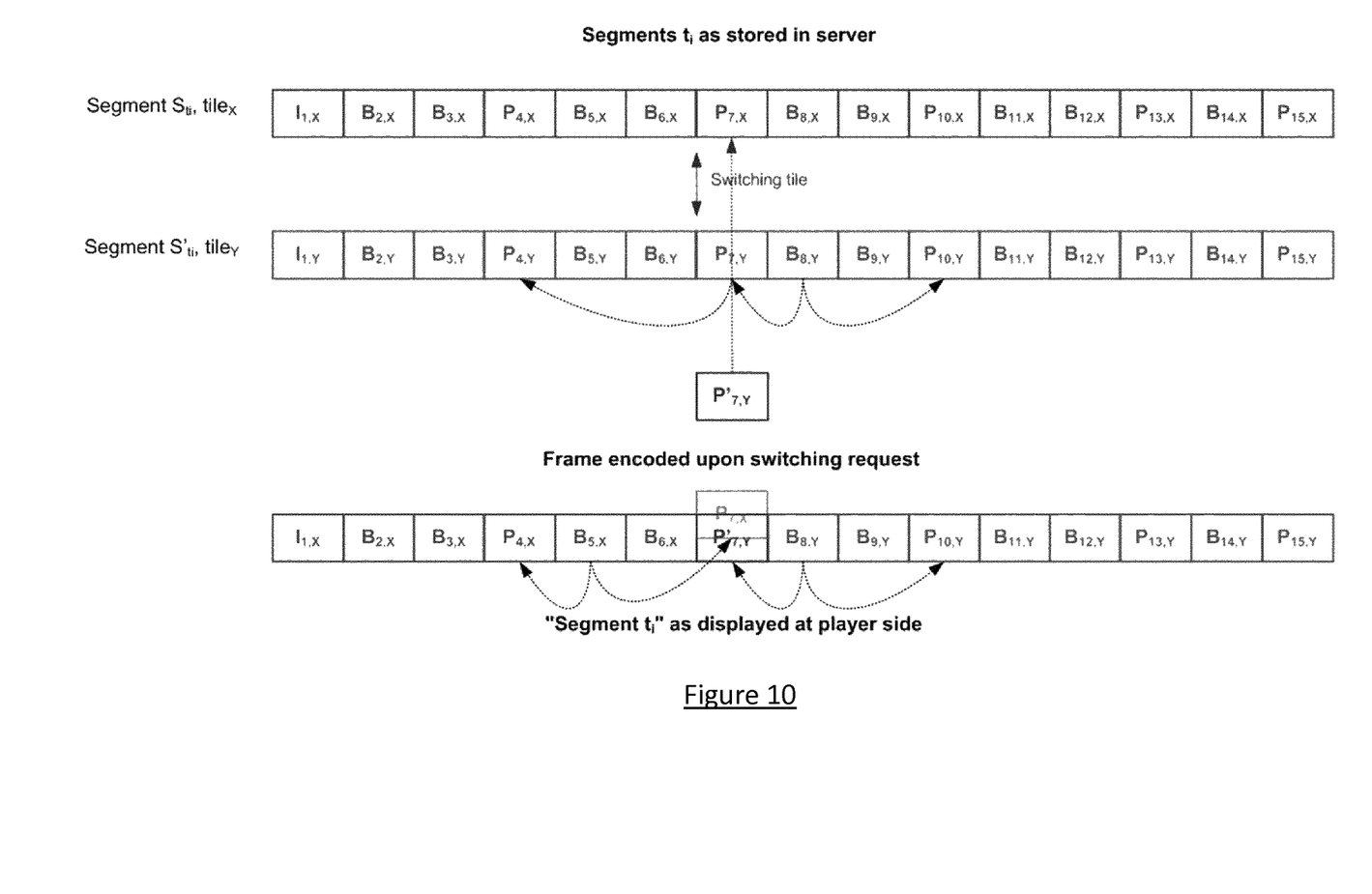
FIG. 10 shows an exemplary implementation of the method of FIG. 9A wherein an aiming switching time corresponds to a P frame of a Group Of Pictures, according to an embodiment.

In the illustrative but non-limitative example shown in FIG. 10, a GOP can comprise 15 frames with only one I frame, such as I-B-B-P-B-B-P-B-B-P-B-B-P-B-P (considering the display order) which is an encoding scheme wherein B frames may use the previous or preceding I or P frame and the next P frame for prediction and P frames may use the previous or preceding I or P frame. In this illustrative example, the player 104 will acquire the first I frame (Intra-coded frame, coded independently of all other frames) with the first P frame, before being able to decode the first B frame. Since the P and B frames are much smaller than the I frame, the data size to be downloaded before starting the decoding can roughly correspond to half of the volume of the segment data. Naturally, it should be understood that, in different embodiments, a GOP can comprise a number of frames different from 15 (e.g. 10 frames). It should be further noted that, some embodiments can implement any other appropriate encoding scheme.

Figure 9A:
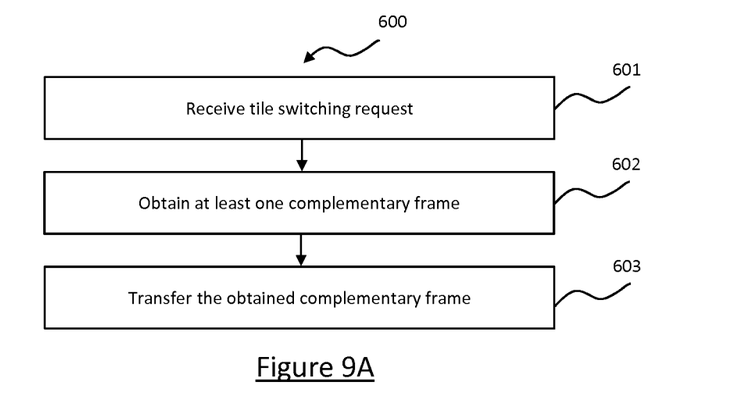
FIG. 9A is a flow chart of an exemplary method for switching tiles during an adaptive streaming session of an immersive video at encoder side, used by some embodiments.

According to an embodiment, the encoder 300 can operate a method 600 as shown in FIG. 9A to provide a tile-based immersive video to the content server 200 in order to run a streaming session with the client terminal 100 upon request. In particular, the method 600 allows for switching from one or more current tile segments $S_{ti}$ to one or more new tile segments $S'_{ti}$ during the segment interval (i.e. within one segment), even if no switching time (e.g. SAP) is defined or present. Upon reception of such a request, the encoder will obtain the appropriate segment part(s) plus possibly additional information, the whole allowing the client terminal to decode the requested part of the new segment $S'_{ti}$ and to display it correctly. It should be understood that the current tile segment(s) and the new tile segment(s) correspond to the same temporal interval of the immersive video.

More particularly, in a step 601, the encoder 300 receives (e.g. via its interface of connection 301 and/or processor(s) 303) a request from the client terminal 100 (e.g. via the content server 200) to switch from at least one current tile segment St, (currently processed and displayed) associated with a current tile 400 to at least one new tile segment $S'_{ti}$ associated with a new tile 400. Such a request can comprise a reference time $t_i+\partial t$ (also called aiming switching time) defining a desired time to implement tile switching from the current tile segment $S_{ti}$ to the new tile segment $S_{ti}$. The reference time is chosen greater than the current displayed timestamp. It should be noted that, when the content server and the encoder are two distinct entities, the request received by the server from the client terminal can be modified before being transferred to the encoder.

In further step 602, the encoder 300 can obtain (e.g. via its processor 303 and/or content generator 305) at least one complementary frame allowing a decoding of the new tile segment $S'_{ti}$ associated with the new tile from the transmitted reference time.

In a step 603, the encoder 300 can transfer the obtained complementary frame to the content server 200 for delivery to the client terminal 100. In case the encoder is embedded within the content server, the obtained complementary frame can be internally transferred (e.g. via the internal bus 206) between the encoder and dedicated element(s) (e.g. the streaming controller 203 and/or the storing means 205) of the content server.

Figure 9B:
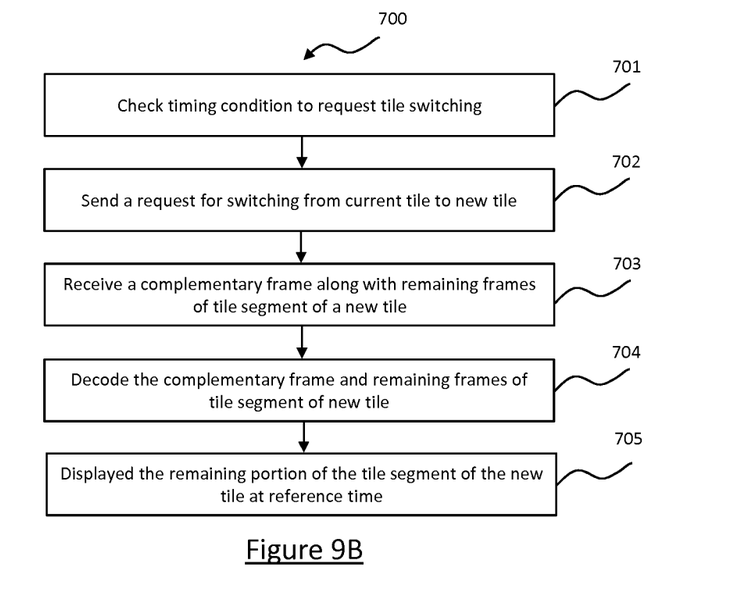
FIG. 9B is a flow chart of an exemplary method for switching tiles during an adaptive streaming session of an immersive video at client side, used by some embodiments.

According to an embodiment, the client terminal 100 can implement a method 700 as shown in FIG. 9B to request tile switching during a streaming session of a tile-based immersive video.

In a step 701, before sending a request for tile switching, a timing condition (e.g. depending on the reference time, an encoding time of the complementary frame, a loading time and a decoding time of some frames of the new tile segment $S'_{ti}$ comprising at least the complementary frame, and a round trip time, as specified hereinafter) might be preliminary checked.

In a step 702, when the timing condition is met (when implemented), the client terminal sends to the server 200 a request for tile switching comprising a reference time $t_i+\partial t$ to switch from one current tile to a new tile.

It should be noted that the embodiments apply to switch from one current tile to a new tile overlapping the current tile, but also to switch from one current tile to a new tile without any overlapping between tiles.

In a step 703, the client terminal 100 can receive, from the server 200, a remaining portion of a new tile segment $S'_{ti}$ of the new tile, which comprises a complementary frame along with the last frames of the tile segment $S'_{ti}$ of the new tile.

In a step 704, the client terminal 100 (e.g. thanks to its processor(s) 105 and/or its video player 104) can decode the received complementary frame and the remaining frames of the new tile segment $S'_{ti}$ from the decoded complementary frame (which can be displayed or not).

In a step 705, the remaining portion of the tile segment $S'_{ti}$ of the new tile can be displayed on the screen 107 at time $t_i+\partial t$. Depending on the time to switch (i.e. reference time), the complementary frame can be displayed or not. In particular, when the reference time corresponds to a P frame in the current tile segment $S_{ti}$, the complementary frame is configured to be decoded and displayed by the player. When the current time corresponds to a B frame in the current tile segment $S_{ti}$, the complementary frame is only decoded without being displayed by the player.

With the exemplary GOP shown in FIG. 10 relying on an encoding scheme wherein B frames may use the previous P frame and the next P frame for prediction and P frames use the previous I or P frame, the reference time $t_i+\partial t$ specified in the request sent by the client terminal ($t_i$ being the starting time of the current tile segment St) can correspond to either a P frame or a B frame (following either a P frame or B frame) in the current tile segment of the current tile (e.g. referenced tile X in the example of FIG. 10). The current tile segment $S_{ti}$ of current tile X and the new tile segment $S'_{ti}$ of new tile Y correspond to the same temporal interval of the immersive video (starting at time $t_i$).

When the reference time corresponds to a P frame as shown in FIG. 10 (i.e. frame $P_{7,X}$), the complementary frame consists in one new frame (in the example of FIG. 10, a P frame) encoded with reference to one or more frames of current tile segment already sent to the client terminal 200 (in the example the frame $P_{7,X}$ of current tile X segment). In such a case, the complementary frame is arranged at reference time ti+∂t in the remaining portion of the new tile segment $S'_{ti}$. The player 104 of the client terminal 200 is then able to decode and display this complementary frame (e.g. $P'_{7,Y}$ in the example of FIG. 10).

It should be noted that the frame $P_{7,X}$ of the current tile X segment $S_{ti}$ is sent to the client terminal 200 and is decoded by its player 104, since frame $P_{7,X}$ (which is not displayed on the screen 107) is used for decoding the previous B frames of the current tile X segment $S_{ti}$ (e.g. $B_{5,X}$ and $B_{6,X}$).

Figure 11:
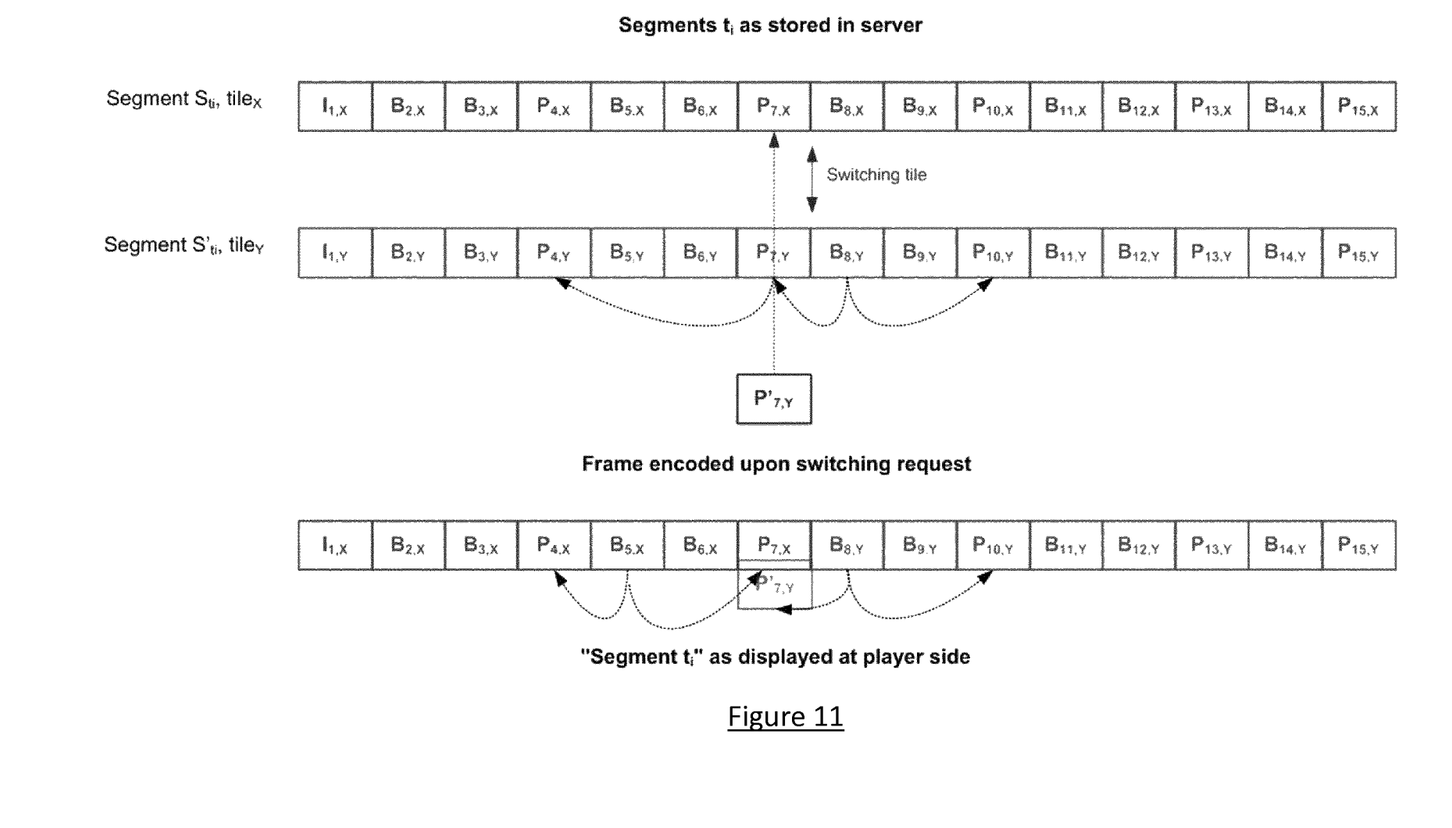
FIG. 11 shows an exemplary implementation of the method of FIG. 9A wherein an aiming switching time corresponds to a B frame of a Group Of Pictures following a previous P frame, according to an embodiment.

When the reference time corresponds to a B frame following a P frame as shown in the example of FIG. 11 (i.e. the frame $B_{8,X}$), the complementary frame consists in one new frame encoded with reference to one or more frames of current tile segment $S_{ti}$ (in the example frame $P_{7,X}$ of current tile X segment), previously transmitted to the client terminal 200. In such a case, the complementary frame is arranged one frame prior to the frame at reference time ti+∂t (i.e. $B_{8,Y}$ in FIG. 11) belonging to the remaining portion of the new tile segment $S'_{ti}$. The player 104 of the client terminal 200 is then able to decode this complementary frame (in the example $P'_{7,Y}$ in FIG. 11) without displaying it on the screen 107. The complementary frame $P'_{7,Y}$ will be used as reference frame for next frames (also called remaining frames) of the new tile segment $S'_{ti}$ for new tile Y.

Figure 12:
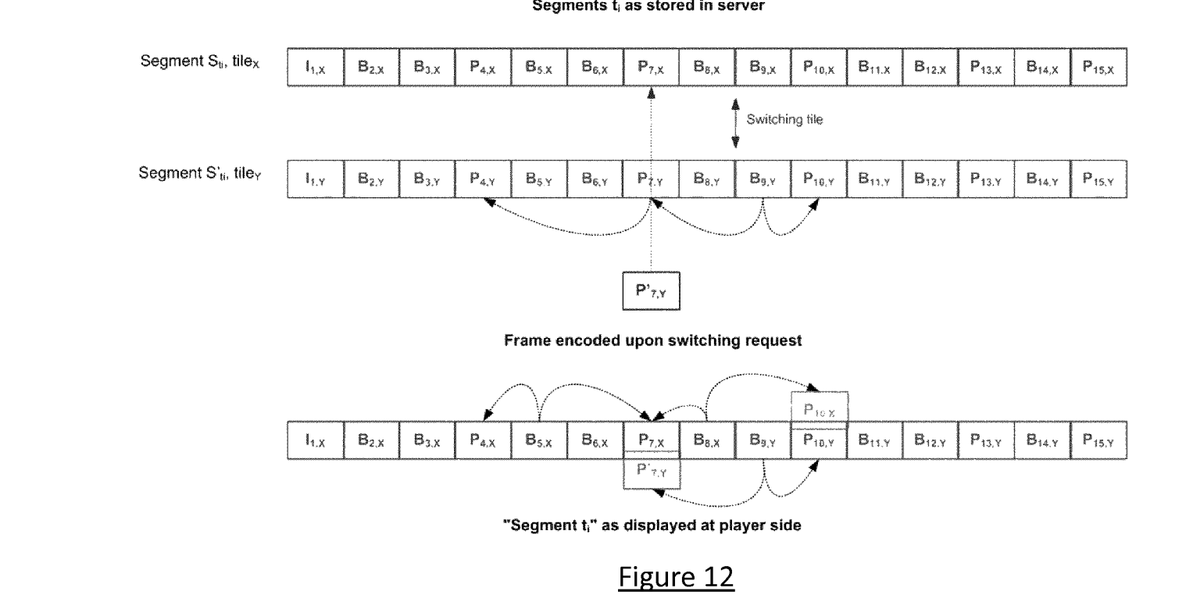
FIG. 12 shows an exemplary implementation of the method of FIG. 9A wherein an aiming switching time corresponds to a B frame of a Group Of Pictures following a previous B frame, according to an embodiment.

When the reference time corresponds to a B frame following a B frame as shown in the example of FIG. 12 (i.e. the frame $B_{9,X}$), the complementary frame consists in one new frame (in the example of FIG. 12, a P frame) encoded with reference to one or more frames of current tile segment $S_{ti}$ previously transmitted to the client terminal 200 (in the example the frame $P_{7,X}$ of current tile X segment, i.e. the preceding P frame of the current tile segment). In such a case, the complementary frame is arranged two frames prior to the frame at reference time ti+∂t (i.e. $B_{9,Y}$ in FIG. 11) belonging to the remaining portion of the new tile segment $S'_{ti}$. The player 104 of the client terminal 200 is then able to decode this complementary frame (in the example $P'_{7,Y}$ in FIG. 11) without displaying it on the screen 107. The complementary frame $P'_{7,Y}$ will be used as reference frame for next frames of the new tile segment $S'_{ti}$ for new tile Y. As shown in FIG. 12, the frame $P_{10,X}$ of current tile segment is transmitted but not displayed (since arranged after tile switching), in order to be able to decode the frame $B_{8,X}$ of current tile segment which is transmitted and displayed (frame $B_{8,X}$ is encoded with reference to frames $P_{7,X}$ and $P_{10,X}$).

It should be understood that, whatever the type of frame corresponding to the reference time (i.e. a P frame, a B frame following a P frame, a B frame following a B frame), the complementary frame is arranged at time $t_i+∂t-n*\text{frame\_duration}$, wherein n is an integer belonging to [0, 2] (n=0 for a P frame, n=1 for a B frame following a P frame, n=2 for a B frame following a B frame).

When the reference time corresponds to a B frame following a previous B frame (as shown in the example of FIG. 12), 17 frames are transmitted to implement tile switching between a current tile segment of a current tile and a new tile segment of a new tile. When the reference time corresponds to a P frame of the GOP (as shown in FIG. 10) or a B frame following a P frame (as shown in FIG. 11), 16 frames are transmitted to implement tile switching.

The reference frame(s) used to encode the complementary frame may be an I frame, a P frame or a B frame. In addition, the reference frame(s) used to obtain the complementary frame can correspond to frame(s) of the current segment St; of current tile X already transmitted to the client terminal (leading to an efficient encoding in case of overlapping between the current tile and the new tile). In a complement or variant, the reference frame(s) used to obtain the complementary frame can correspond to frame(s) of the new tile segment $S'_{ti}$ of current tile Y.

It should be understood that in examples of FIGS. 10 to 12, frames of the GOP after the complementary frame $P'_{m,Y}$ (m being the temporal position of the complementary frame in the GOP of the tile segment (in display order), so that m is equal to 7 in the example of FIGS. 10 to 12) are devoid of any reference to frame preceding the complementary frame $P'_{m,Y}$.

Figure 13:
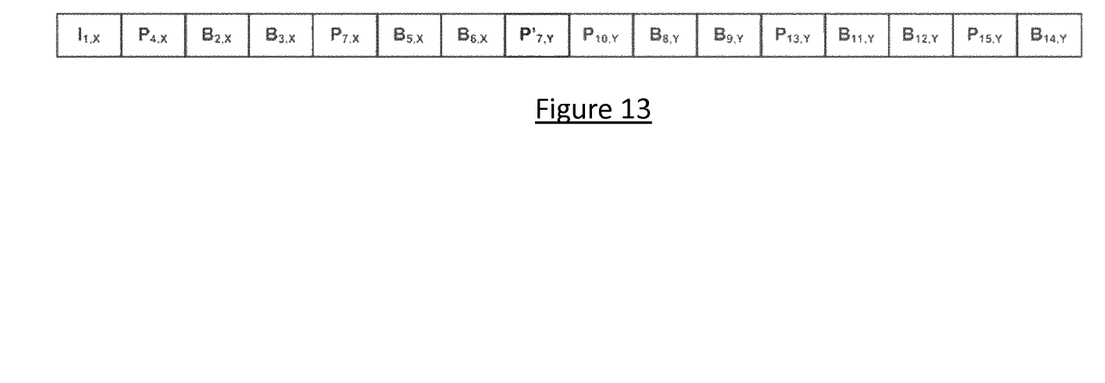
FIG. 13 depicts, according to a transmission order, a Group Of Pictures associated with a tile segment of an immersive video, in accordance with an embodiment.

In the example of FIGS. 10 to 12, the frames of the GOP are represented according to the frame display order (which differs from the frame transmission order, some B frames can refer to frames of a greater timestamp). FIG. 13 shows the frames of the exemplary GOP according to their transmission order. Note that the frame number 7 (display order) of the GOP is sent twice to the client terminal 200 (once for current tile segment of current tile (frame $P_{7,X}$), once for new tile segment of new tile as the complementary frame $P'_{7,Y}$), but only one is displayed depending on the reference time to switch (either $P_{7,X}$ or $P'_{7,Y}$ in the examples of FIGS. 10 to 12).

The embodiments allow for switching at any timestamp within a current segment interval (even if no SAP is defined), assuming that the server 200 and the player 104 have the time to perform some operations. Indeed, as shown in the illustrative but non limitative example of FIG. 14, when the reference tile corresponds to a B frame following a P frame, the time to encode the complementary frame (i.e. frame $P'_{7,Y}$) plus the time to load and to decode the 3 first frames (i.e. $\{P'_{7,Y}, P_{10,Y}, B_{8,Y}\}$) of the remaining portion of segment $S'_{ti}$ (hereinafter referenced segment') of the new tile should be less than the interval between the time to request tile switching $t_{req'}$ and the reference time $t_i+∂t$ (i.e. the switching time). The segment' comprises the complementary frame $P'_Y$ and the last frames of tile segment $S'_{ti}$ of the new tile Y from the reference time.

Figure 14:
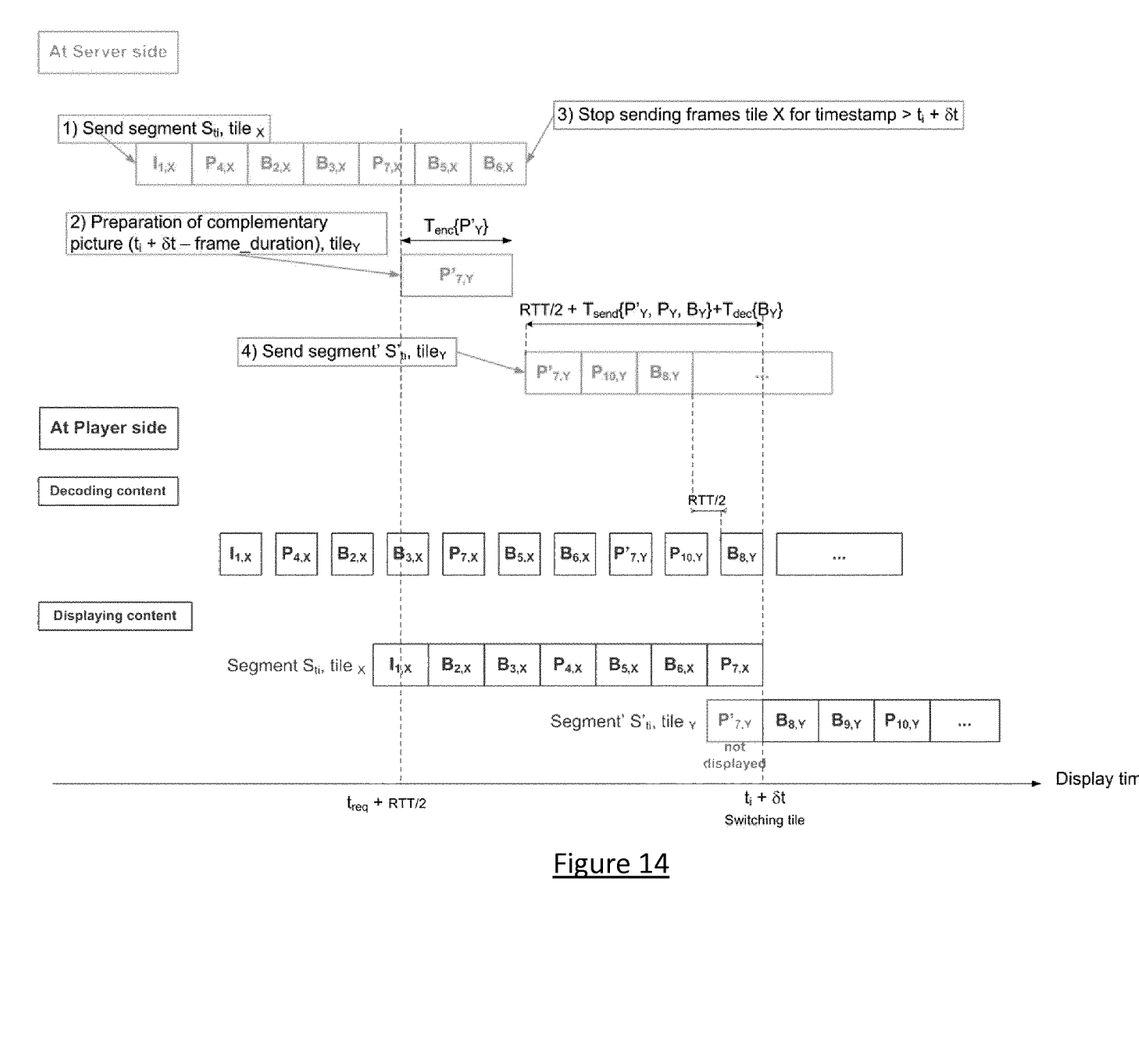
FIG. 14 shows exemplary operations performed at server side and at client side when receiving a request for switching tile during a streaming session of an immersive video, in accordance with an embodiment.

In particular, the sequence of operations for implementing tile switching in accordance with the example of FIG. 14, is described as follows:

at time $t_{req'}$, a request for tile switching is sent to the server 200 by the client terminal 100, after a time RTT/2, the server 200 receives the request and starts the encoding of the complementary frame (i.e. $P'_{7,Y}$ in the example), RTT corresponding to the round-trip time (i.e. time spent in the network between the time the client sends a request and the time it begins to receive data corresponding to this request), after a time $T_{enc}$, the complementary frame ($P'_{7,Y}$) is ready to be sent. When the transmission of the last frame of the tile X (used to decode the portion of the current tile segment up to the reference time) is just finished, the server 200 can start the transmission of the complementary frame ($P'_{7,Y}$), after a new time RTT/2, the client terminal 100 starts to receive the complementary frame ($P'_{7,Y}$), after an additional time $T_{send}\{P'_{7,Y}, P_{10,Y}, B_{8,Y}\}$ corresponding to the transmission duration of the required complementary frame and the following 2 frames of segment', the client terminal 100 is ready to decode the first frame ($B_{8,Y}$) following the complementary frame of the new tile segment (frames $P'_{7,Y}$ and $P_{10,Y}$ have already been decoded in parallel and are ready when the decoding is assumed faster than the transmission), after a time $T_{dec}\{B_{8,Y}\}$ corresponding to the decoding duration of the first frame following the complementary frame, frame $B_{8,Y}$ is ready to be displayed by the client terminal 100.

From the above, for a reference time corresponding to a B frame following a P frame, one can derive a timing condition for the client terminal 100 to request a new tile segment of a new tile during the processing of a current tile segment:

$$t_{req'} < t_i + ∂t - (RTT\ T_{enc}\{P'_{7,Y}\} + T_{send}\{P_{7,Y}, P_{10,Y}, B_{8,Y}\} + T_{dec}\{B_{8,Y}\})$$

More generally, whatever the type of frame corresponding to the reference time (i.e. a P frame, a B frame following a P frame, a B frame following a B frame), the timing condition for the client terminal 100 to request a new tile segment of a new tile during the processing of a current tile segment can be defined by:

$$t_{req'} < t_i + ∂t - (RTT\ \max(T_{enc}, T_{send\_remain}) + T_{send\_new} + T_{dec})$$

wherein:

$T_{enc}$ corresponds to the encoding duration of the complementary frame, $T_{send\_remain}$ corresponds to the transmission duration of the remaining data of current tile segment to be sent until the reference time, $T_{send\_new}$ corresponds to the transmission duration of the required complementary frame and the following frames of segment' used for decoding the frame arranged at the reference time, $T_{dec}$ corresponds to the decoding duration of the frame arranged at the reference time.

It should be noted that the client terminal can be preliminary informed by the server of such timing condition (e.g. upon launch of the streaming session, for example with information provided by a manifest).

As shown in the example of FIG. 14 depicting operations occurring at the server side and at player side when switching time corresponds to a B frame following a P frame, the server 200 is currently sending tile segment S'$_n$ of current tile X. At time t$_{req}$+RTT/2, the server 200 receives a request from client terminal 100 to switch from current tile X to new tile Y. Upon receipt of the request, when time t$_{req'}$ meets the timing condition as described above, the server 200 prepares (via the encoder 300) the complementary frame corresponding to the frame arranged at time t$_i$+∂t−frame_duration. The server 200 cancels the sending of tile segment St, of current tile X at a time not earlier than t$_i$+∂t. In the example of FIG. 14, the complementary frame P'$_{7,Y}$ is received by the client terminal 100 and decoded but is not displayed.

In another embodiment, a complementary frame (P'$_Y$) can be pre-encoded and stored at server side for one or more segments and/or for one or more tiles, decreasing processing resources used at server/encoder side. In such embodiment, the tile switching is only allowed at given moments (for instance listed in a manifest prepared by the server and delivered to the client terminal).

Thanks to the described embodiments, during an adaptive streaming session, tile switching can be allowed during the segment interval, even if no switching time (e.g. SAP) is defined.

In addition, one or more of the described embodiments are adapted for implementation of slow-motion mode within an adaptive streaming session of a tiled-based immersive video. In the illustrative but non-limitative example of adaptive streaming standard MPEG-DASH, the client terminal can operate the slow-motion operation in the same manner as for the normal play mode of operation for both tile and segment selection and recovery when a dedicated content is available for slow motion mode. In lack of dedicated slow-motion content, same content will be played in normal and slow-motion mode. Thus, a DASH segment will be played for a longer time during slow-motion than in normal play mode. As an example, if the video frame rate is divided by two (slow-motion factor) during slow motion, the segment will be actually displayed two times longer.

When slow motion mode is not available for the whole immersive video (but only for some sequences), the manifest sent by the content server and received by the client terminal can indicate such information (e.g. by listing the segment(s) for which slow motion mode is available).

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. An encoder comprising:
at least one processor configured to:
encode an immersive video spatially tiled with a set of tiles and temporally divided into a plurality of tile segments, a tile covering a portion of a scene of the immersive video and a tile segment being associated with a tile of the set of tiles;
receive a request for a complementary frame, the complementary frame comprising a new P frame to enable a decoder to switch at a reference time, which is greater than a current displayed timestamp, from a current tile segment associated with a current tile to a new tile segment associated with a new tile, wherein the new tile segment corresponds to a same temporal interval of the immersive video as the current tile segment; and
generate and transmit, to the decoder, the complementary frame;
wherein the request for the complementary frame includes the reference time to implement tile switching from the current tile segment to the new tile segment;
wherein at least one frame in the new tile segment is predicted from the complementary frame; and
wherein the complementary frame is generated from one or more frames of the current tile segment.

2. The encoder of claim 1, wherein the complementary frame is predicted from a preceding P frame of the current tile segment of the current tile.

3. The encoder of claim 1, wherein the current tile and the new tile are partially covering the same portion of the scene.

4. The encoder of claim 1, wherein the remaining frames defining the new tile segment from the reference time are devoid of any reference to one or more frames arranged before the complementary frame.

5. The encoder according to claim 1, wherein said one or more frames of the current tile segment used for generating the complementary frame are already delivered to a player.

6. A method for encoding, at an encoder, an immersive video spatially tiled with a set of tiles and temporally divided into a plurality of tile segments, a tile covering a portion of a scene of the immersive video and a tile segment being associated with a tile of the set of tiles,
the method comprising:
receiving a request, from a decoder, for a complementary frame, the complementary frame comprising a new P frame, the complementary frame enabling to enable a decoder to switch at a reference time, which is greater than a current displayed timestamp, from a current tile segment associated with current tile to a new tile segment associated with a new tile, wherein the new tile segment corresponds to a same temporal interval of the immersive video as the current tile segment; and
generating and transmitting, to the decoder, the complementary frame;
wherein the request for the complementary frame includes the reference time to implement tile switching from the current tile segment to the new tile segment; and
wherein at least one frame in the new tile segment is predicted from the complementary frame; and
wherein the complementary frame is generated from one or more frames of the current tile segment.

7. The method of claim 6, wherein the complementary frame is predicted from a preceding P frame of the current tile segment of the current tile.

8. The method of claim 6, wherein the current tile and the new tile are partially covering the same portion of the scene.

9. The method of claim 6, wherein the remaining frames defining the new tile segment from the reference time are devoid of any reference to one or more frames arranged before the complementary frame.

10. The encoder according to claim 6, wherein said one or more frames of the current tile segment used for generating the complementary frame are already delivered to a player.

11. A player comprising:
at least one processor configured to:
send a request to switch from at least one current tile segment associated with a current tile to at least one new tile segment associated with a new tile corresponding to a same temporal interval of an immersive video as the current tile segment, wherein the request comprises a reference time, which is greater than a current displayed timestamp, to implement tile switching from the current tile segment to the new tile segment; and
receiving a complementary frame, comprising a new P frame, wherein the complementary frame enables the player to switch, at the reference time, from the current tile segment associated with the current tile to the new tile segment associated with the new tile;
wherein at least one frame in the new tile segment is predicted from the complementary frame; and
wherein the complementary frame is generated from one or more frames of the current tile segment.

12. The player of claim 11, wherein the complementary frame is predicted from a preceding P frame of the current tile segment of the current tile.

* * * * *